US012255518B2

(12) United States Patent
Kim

(10) Patent No.: US 12,255,518 B2
(45) Date of Patent: Mar. 18, 2025

(54) DRIVING MOTOR HAVING BLDC MOTOR AND SWIVEL ACTUATOR USING SAME

(71) Applicant: AMOTECH CO., LTD., Incheon (KR)

(72) Inventor: Byung Soo Kim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 174 days.

(21) Appl. No.: 18/030,679

(22) PCT Filed: Oct. 28, 2021

(86) PCT No.: PCT/KR2021/015289

§ 371 (c)(1),
(2) Date: Apr. 6, 2023

(87) PCT Pub. No.: WO2022/092840

PCT Pub. Date: May 5, 2022

(65) Prior Publication Data

US 2023/0261544 A1 Aug. 17, 2023

(30) Foreign Application Priority Data

Oct. 28, 2020 (KR) ........................ 10-2020-0141003

(51) Int. Cl.

*H02K 7/11* (2006.01)
*H02K 1/14* (2006.01)
*H02K 1/2706* (2022.01)

(Continued)

(52) U.S. Cl.

CPC ............. *H02K 7/1166* (2013.01); *H02K 1/14* (2013.01); *H02K 1/2706* (2013.01); *H02K 7/003* (2013.01);

(Continued)

(58) Field of Classification Search

CPC ........ H02K 1/14; H02K 1/2706; H02K 7/003; H02K 7/081; H02K 7/088; H02K 7/1166;

(Continued)

(56) References Cited

U.S. PATENT DOCUMENTS

2002/0162413 A1 11/2002 Nagai et al.
2013/0109526 A1* 5/2013 Oishi .................. H02K 7/1166 475/149

(Continued)

FOREIGN PATENT DOCUMENTS

KR 101323777 10/2013
KR 20160041009 4/2016

(Continued)

OTHER PUBLICATIONS

Kim et al., English Machine Translation of KR 101323777 (Year: 2013).*
Lee et al., English Machine Translation of KR 101920041 (Year: 2018).*
International Search Report—PCT/KR2021/015289 dated Feb. 3, 2022.

*Primary Examiner* — Rashad H Johnson

(74) *Attorney, Agent, or Firm* — CANTOR COLBURN LLP

(57) ABSTRACT

Provided is a driving motor having a slim BLDC motor vertically mounted in a housing and a swivel actuator using same. The swivel actuator has an annular stator arranged on the bottom of the housing and a rotor arranged therein and having a worm gear integrally formed on the upper side thereof. A worm wheel of a power transmission shaft forming a gear train is gear-engaged with the worm gear of the rotor, a worm gear formed on the other end of the power transmission shaft is coupled to a worm wheel located at the lower end of a pinion gear unit, and a pinion gear located at the upper end of the pinion gear unit is coupled to a ring gear formed inside a lateral surface portion of a rotating table, so as to rotate the rotating table to which a passive object is fixed.

14 Claims, 12 Drawing Sheets

200

27
20
13
12
11a

(51) Int. Cl.

| | |
|---|---|
| ***H02K 7/00*** | (2006.01) |
| ***H02K 7/08*** | (2006.01) |
| ***H02K 7/116*** | (2006.01) |
| ***H02K 11/215*** | (2016.01) |
| ***H02K 21/16*** | (2006.01) |
| *F21S 41/657* | (2018.01) |

(52) U.S. Cl.
CPC ............. *H02K 7/081* (2013.01); *H02K 7/088* (2013.01); *H02K 11/215* (2016.01); *H02K 21/16* (2013.01); *F21S 41/657* (2018.01); *H02K 2203/03* (2013.01)

(58) Field of Classification Search
CPC ............... H02K 7/2706; H02K 11/215; H02K 11/2706; H02K 2203/03; H02K 21/16; F21S 41/657
USPC ............................................................ 310/83
See application file for complete search history.

(56) References Cited

U.S. PATENT DOCUMENTS

2016/0238106 A1* 8/2016 Park ...................... F16H 57/028
2021/0107615 A1* 4/2021 Takeuchi ............... B63H 20/12
2022/0348114 A1* 11/2022 Lee .................... B60N 2/02246
2023/0261544 A1* 8/2023 Kim ..................... H02K 7/1166 310/83
2023/0369939 A1* 11/2023 Kim ....................... H02K 7/116
2024/0154494 A1* 5/2024 Kim ....................... H02K 7/003

FOREIGN PATENT DOCUMENTS

KR 20170050869 5/2017
KR 20180014304 2/2018
KR 101920041 11/2018
KR 102002727 7/2019

* cited by examiner

DRIVING MOTOR HAVING BLDC MOTOR AND SWIVEL ACTUATOR USING SAME

TECHNICAL FIELD

The present invention relates to an actuator, and more particularly, to a driving motor having a slim brushless direct-current (BLDC) motor vertically mounted in a housing, and a swivel actuator using the driving motor.

BACKGROUND ART

An electric actuator rotates or linearly moves a passive object to be driven with a high torque rotational force obtained by torque conversion of the rotational force generated from a rotating power source.

In general, a conventional actuator uses a DC motor as a rotating power source, and the rotor output of the DC motor is torque-converted through a gear train in which a worm gear and a plurality of spur gears which are integrally formed in a rotor output end are gear-engaged with generate a high torque rotational output from an actuator output end.

Since the conventional electric actuator uses a DC motor with an external casing as a rotating power source, the magnet for position sensing of the rotor is not embedded in the casing, but attached separately to the outside and sensed using a Hall sensor, so the structure of connecting the Hall sensor from the PCB with the motor driving circuit is complicated.

If the actuator does not use a Hall sensor, only forward and reverse rotational motions are possible.

In general, the actuator has a low height of the housing as a whole product in use, and one of the horizontal and the vertical is configured to have a long shape. Accordingly, it is difficult to employ a structure in which a DC motor having an outer casing is vertically mounted on the inner bottom of the housing.

In the case of using a DC motor, the brake torque should be increased using a worm gear because the rotor should be held in a stationary position when external pressure is applied on the output shaft that rotates forward and reverse.

To use a worm gear and a worm wheel in a DC motor and to deliver power to the position where the output shaft is located, the connection therebetween is usually formed using a spur gear, in which case the following problems exist.

First, since the housing height of the actuator is low, there is a problem in that a DC motor is generally laid and applied, and thus an assembly structure is difficult and a unit cost is increased. That is, there is a problem in securing an assembly space due to the casing of the DC motor and the bearing that needs to hold the worm shaft.

Second, the structure of connecting the motor power in a controller becomes complicated.

Third, position information of the rotor is required for accurate position control in the actuator. To this end, since a position sensing magnet is placed at the bottom of a warm gear of a DC motor and a position sensing Hall sensor IC is applied, the structure of connecting a Hall sensor to a printed circuit board (PCB) is complicated to use DC power and to sense the position.

Fourth, in a gear train that uses multiple spur gears to obtain a large reduction ratio, the tolerance the rotating power of the driving motor increases, resulting in a large backlash and difficulty in controlling the precise position.

Korean Patent Application Publication No. 10-2017-0050869 (Patent Document 1) discloses an electric actuator using a direct-current (DC) motor, including: a power input unit including the DC motor; a planetary decelerator including a planetary gear for increasing torque by receiving a driving force from the power input unit and having an output shaft; an accelerator with a detachable cover that receives driving force from the planetary decelerator, increases the number of rotations lowered in proportion to the increased torque, and opens one side; a screw shaft having a screw thread to convert the rotational motion transmitted from the accelerator into a linear motion; and a cylinder unit having a displacement nut screw-coupled to the screw shaft in a rotational manner to move forward and backward by rotating of the screw shaft.

As the electric actuator of Patent Document 1 uses a DC motor, precise position control is difficult, and assembly productivity is reduced by adopting the planetary decelerator for torque enhancement.

In general, when the size of the actuator is small, the size of the driving motor is small, and thus the output becomes small. In this case, in order to obtain a high torque output value at the output terminal of the actuator, the rpm of the motor should be large, and the reduction ratio should be large using multiple spur gears, resulting in an increase in noise.

Recently, a variable headlamp that may maximize the driver's night view in conjunction with the driver's steering direction has been proposed, and a motor equipped with a lead screw may be used as a swiveling actuator that implements the swiveling and leveling of the headlamp.

Korean Patent Application Publication No. 10-2018-0014304 (Patent Document 2) proposes a swivel actuator that may minimize operating noise and vibration generation and improve assembly and productivity by improving the assembly composition and coupling structure of the actuator that moves the vehicle headlamp.

Patent Document 2 employs a transfer screw that changes the rotational power of the motor into a straight line motion to move a ramp moving unit coupled to the transfer screw.

DISCLOSURE

Technical Problem

To solve the conventional problems, it is an objective of the present invention to provide a swivel actuator capable of rotating a rotational passive object by a power transmission structure capable of minimizing backlash by a gear train changing structure in which a worm wheel and a worm gear are integrally formed at intervals on a power transmission shaft to minimize the number of coupling gears.

It is another objective of the present invention to provide a swivel actuator, capable of miniaturizing the overall size and suppressing vibration generation, by installing a BLDC driving motor on the bottom of a housing, and arranging, inside the housing, a gear train, in which a worm wheel and a worm gear are integrally formed with a distance from a power transmission shaft, in comparison with a conventional technology in which a motor unit, a gear unit, and a rotating unit are separately assembled to the inside and the outside of the housing.

It is another objective of the present invention to provide a swivel actuator having a compact and slim structure by installing a BLDC motor in the form of a core motor vertically on the bottom of a housing, and installing a gear train for reduction at an upper portion, to improve a problem of a conventional structure of using a DC motor laid inside a housing having a low height.

It is another objective of the present invention to provide a swivel actuator capable of reducing the overall size by optimally arranging, inside a housing, a gear train in which a small-sized driving motor, a worm wheel, and a worm gear are integrated with a power transmission shaft.

It is another objective of the present invention to provide a swivel actuator with an output worm gear of a multiple thread screw as a gear train to prevent a reduction gear ratio from increasing while lowering the rpm of a driving motor, which is a factor of noise increase.

Technical Solution

According to an aspect of the present invention, there is provided a driving motor for a swivel actuator including: a cylindrical housing having a hollow cylindrical portion protruding from a bottom thereof at a center thereof; a rotor rotatably coupled to an outer circumference of the hollow cylindrical portion of the housing; and a stator arranged on the bottom of the housing to rotate the rotor by generating a rotating magnetic field while having an air gap on an outside of the rotor, wherein a first worm gear is integrally formed on an outer circumferential portion of an extension unit extending to an upper portion of the rotor.

The housing may further include a step portion protruding from an inner side wall thereof, and the stator may be arranged at a lower side of the step portion.

The housing may include a cylindrical body case with upper and lower portions opened and two-stage first and second step portions protruding inside; and a circular lower cover with an outer periphery fixed to a lower end of the body case and the hollow cylindrical portion protruding from the center thereof. The second step portion of the body case may separate the gear train from the stator of the swivel actuator.

In addition, an annular groove is formed between the hollow cylindrical portion protruding in the center of a lower cover and the bottom of the housing, A Hall sensor assembly, which is installed close to the lower end of the rotor, is arranged in the annular groove to detect a rotor position signal when the rotor is rotated, and a through-hole communicating with a concave groove of the lower cover may be formed at a lower end of the hollow cylindrical portion so that a cable may pass therethrough.

Moreover, the rotor includes: a rotor support rotatably coupled to an outer circumference of the hollow cylindrical portion and formed in a cup shape; a back yoke coupled to an outer circumference of a cup-shaped portion of the rotor support; and a magnet arranged on an outer circumference of the back yoke, wherein a first worm gear may be integrally formed on an outer circumferential portion of an upper end of the rotor support.

According to another aspect of the present invention, there is provided a swivel actuator including: a cylindrical housing in which a hollow cylindrical portion protrudes from a bottom of a center thereof and first and second step portions protrude from an inner side wall thereof; a driving motor which is arranged on a bottom surface of the housing and has a first worm gear integrally formed on an outer circumference of an extension unit extending to an upper portion of a rotor; a gear train for reduction which is arranged on an upper portion of the second step portion, is coupled to an outer circumference of the first worm gear, has a first worm wheel gear-engaged with the first worm gear on one side of a power transmission shaft, and has a second worm gear formed on the other side of the power transmission shaft; a pinion gear unit having a second worm wheel gear-engaged with the second worm gear at a lower end thereof and a pinion gear integrally formed on an upper end thereof; and a rotating table gear-engaged with a ring gear having the pinion gear of the pinion gear unit integrally formed on an inner side of a side surface portion thereof, to rotate, and having a passive object fixed to an upper surface thereof.

In this case, the driving motor includes: a rotor rotatably coupled to an outer circumference of the hollow cylindrical portion of the housing; and a stator arranged at an outer side of the rotor with an air gap therebetween and arranged on the bottom of the housing to rotate the rotor by generating a rotating magnetic field, wherein the first worm gear may be integrally formed in the extension unit extending to an upper portion of a rotor support.

The swivel actuator according to the present invention may further include: first and second bearings arranged between a lower end of the rotor support and a lower end of the hollow cylindrical portion of the housing so as to rotatably support the rotor; and a third bearing for rotatably supporting the rotating table on an outer circumference of the hollow cylindrical portion of the housing.

In addition, the swivel actuator according to the present invention may further include a ring-shaped stopper inserted between the second bearing and the third bearing installed on the outer circumference of the hollow cylindrical portion to set the positions of the second bearing and the third bearing.

Moreover, the swivel actuator according to the present invention may further include an oil seal installed between the rotating table and the housing and having a lower portion supported by the first step portion of the housing.

In this case, the second worm gear may be formed of a multiple thread screw.

According to another aspect of the present invention, there is provided a swivel actuator including: a cylindrical housing in which a hollow cylindrical portion protrudes from a bottom of a center thereof and a step portion protrudes from an inner wall thereof; a driving motor which is arranged on a bottom surface of the housing and has a first worm gear integrally formed on an outer circumference of an extension unit extending to an upper portion of the rotor; a gear support plate having an outer circumferential portion supported by the step portion; a gear train for reduction which is arranged on an upper portion of the gear support plate, is coupled to an outer circumference of the first worm gear, has a first worm wheel gear-engaged with the first worm gear on one side of a power transmission shaft, and has a first spur gear formed on the other side of the power transmission shaft; a dummy gear coupled to the first spur gear to transmit the rotational force of the first spur gear without reduction; an output shaft having a second spur gear formed to be gear-engaged with the dummy gear on one side of a rotating shaft and a bevel gear formed on the other side thereof; and a rotating table in which a ring gear assembled to a lower portion of the bevel gear is gear-engaged to be rotated, and a passive object is fixed on an upper surface thereof.

Advantageous Effects

As described above, in the present invention, a worm wheel and a worm gear are integrally formed at intervals on a power transmission shaft to minimize backlash by a gear train change structure in which the number of coupling gears is minimized, thereby rotating a rotating table by a power transmission structure capable of minimizing backlash. As a result, the present invention may reduce overall size and secure a space compared to a conventional gear train in which a plurality of spur gears are combined, thereby increasing degree of freedom in design and reducing costs.

In addition, according to the present invention, when compared to the prior art in which the motor unit, the gear unit, and the rotating unit are separated from and assembled to the inside and the outside of a passive object (or a rotating table), a BLDC driving motor is installed on a bottom of a housing, and a gear train having a worm wheel and a worm gear integrally formed at intervals on a power transmission shaft is arranged inside the housing, thereby minimizing the entire size and suppressing occurrence of vibration.

Furthermore, the present invention provides a swivel actuator having a compact and slim structure by installing a BLDC motor in the form of a core motor vertically on the bottom of a housing, and installing a gear train for reduction at an upper portion, to improve a problem of a conventional structure of using a DC motor laid inside a housing having a low height.

In addition, in the present invention, an annular groove is formed between a hollow cylindrical portion protruding from a center of a lower cover and a bottom of a housing, a Hall sensor assembly for detecting a rotor position signal is arranged in the annular groove to be close to a lower end of the rotor, and a through hole communicating with the groove of the lower cover is formed at the lower end of the hollow cylindrical portion such that a cable may pass therethrough.

As a result, according to the present invention, a Hall sensor assembly for detecting a rotor position signal may be easily installed, and a cable may be easily connected between the Hall sensor assembly and a printed circuit board (PCB) having a motor driving circuit embedded therein, so that a BLDC motor may be employed as a driving motor.

According to the present invention, a small driving motor and a gear train, in which a worm wheel and a worm gear are integrally formed on a power transmission shaft, are optimally arranged inside a housing, thereby miniaturizing the overall size.

In addition, the present invention is provided with an output worm gear of a multiple thread screw as a gear train to prevent a reduction gear ratio from increasing while lowering the rpm of a driving motor, which is a factor of noise increase.

BEST MODE FOR CARRYING OUT THE INVENTION

Figure 1:
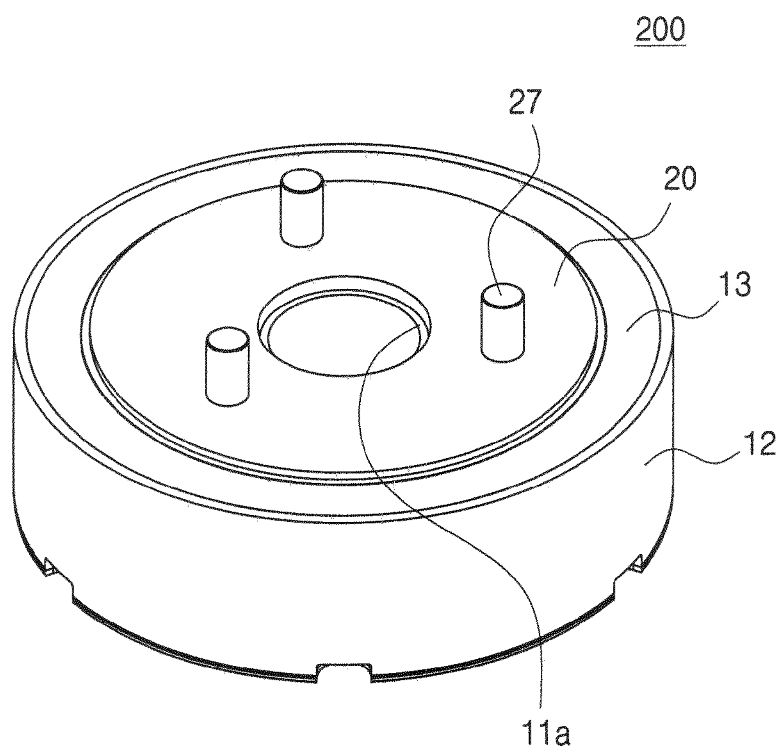
FIGS. 1 and 2 are respectively a perspective view and a plan view of an internal hollow swivel actuator according to a first embodiment of the present invention.
Figure 2:
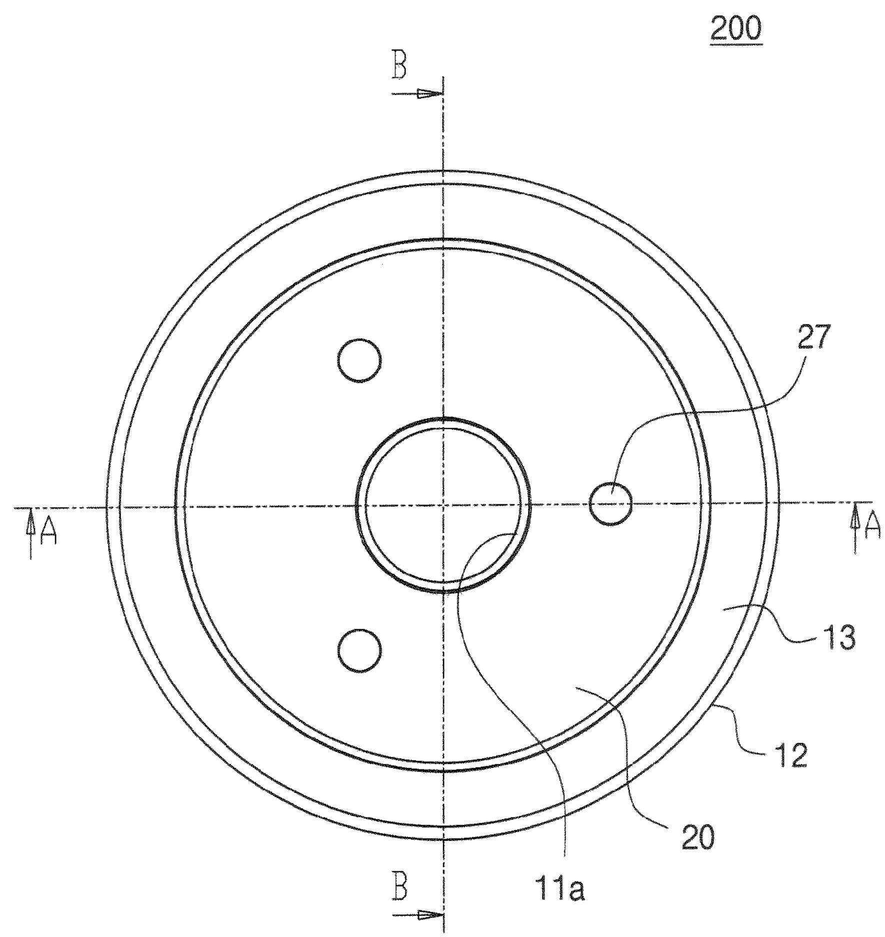
Figure 3A:
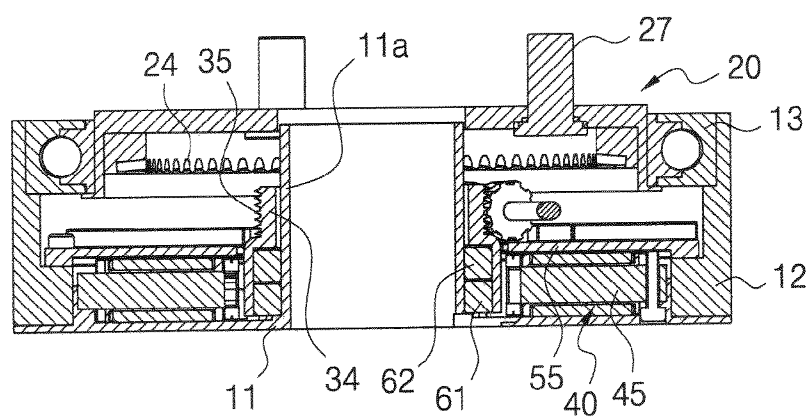
FIGS. 3A and 3B are cross-sectional views of lines A-A and B-B of FIG. 2, respectively.
Figure 3B:
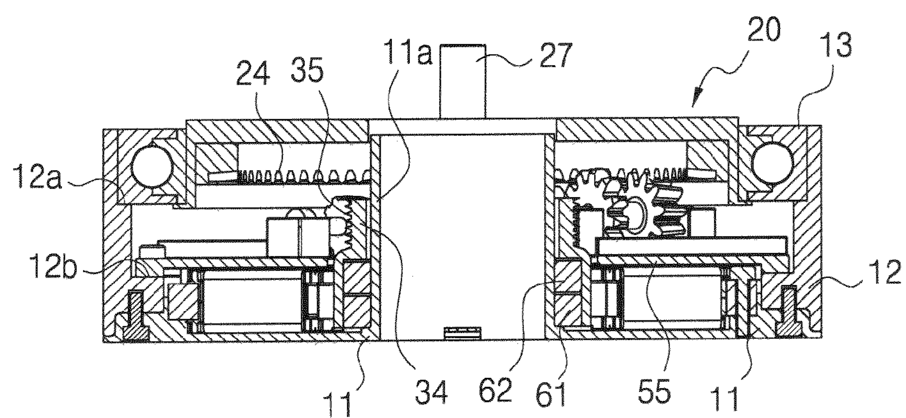
Figure 4:
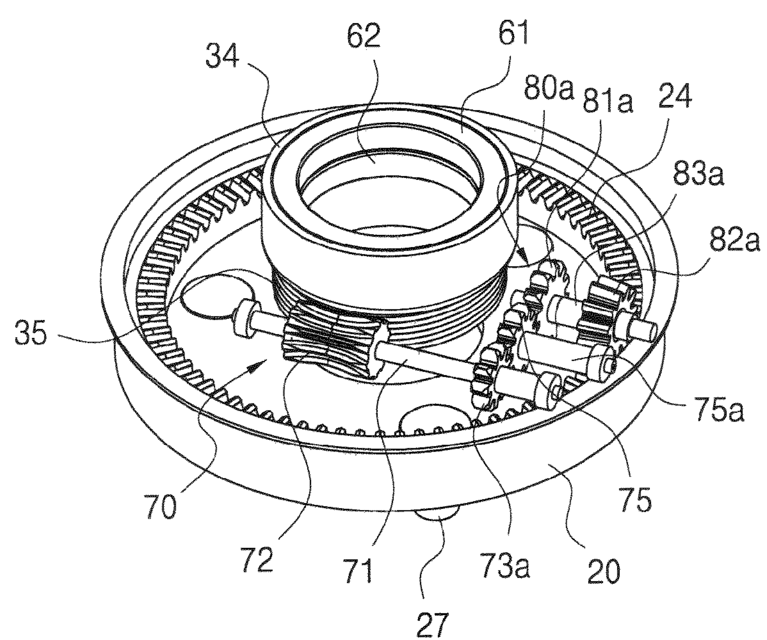
FIG. 4 is a perspective view illustrating a state in which a rotating table is inverted to explain a gear coupling relationship between a ring gear of a rotating table and a gear train in FIG. 2.
Figure 5:
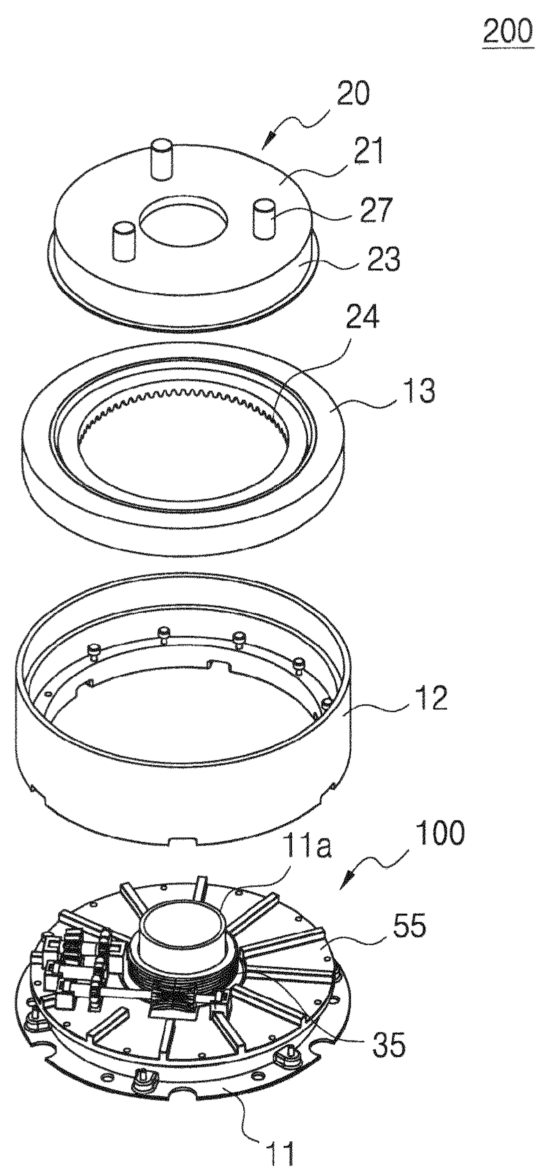
FIGS. 5 and 6 are a module-each exploded perspective view and a fully exploded perspective view of an internal hollow swivel actuator according to the first embodiment of the present invention, respectively.
Figure 6:
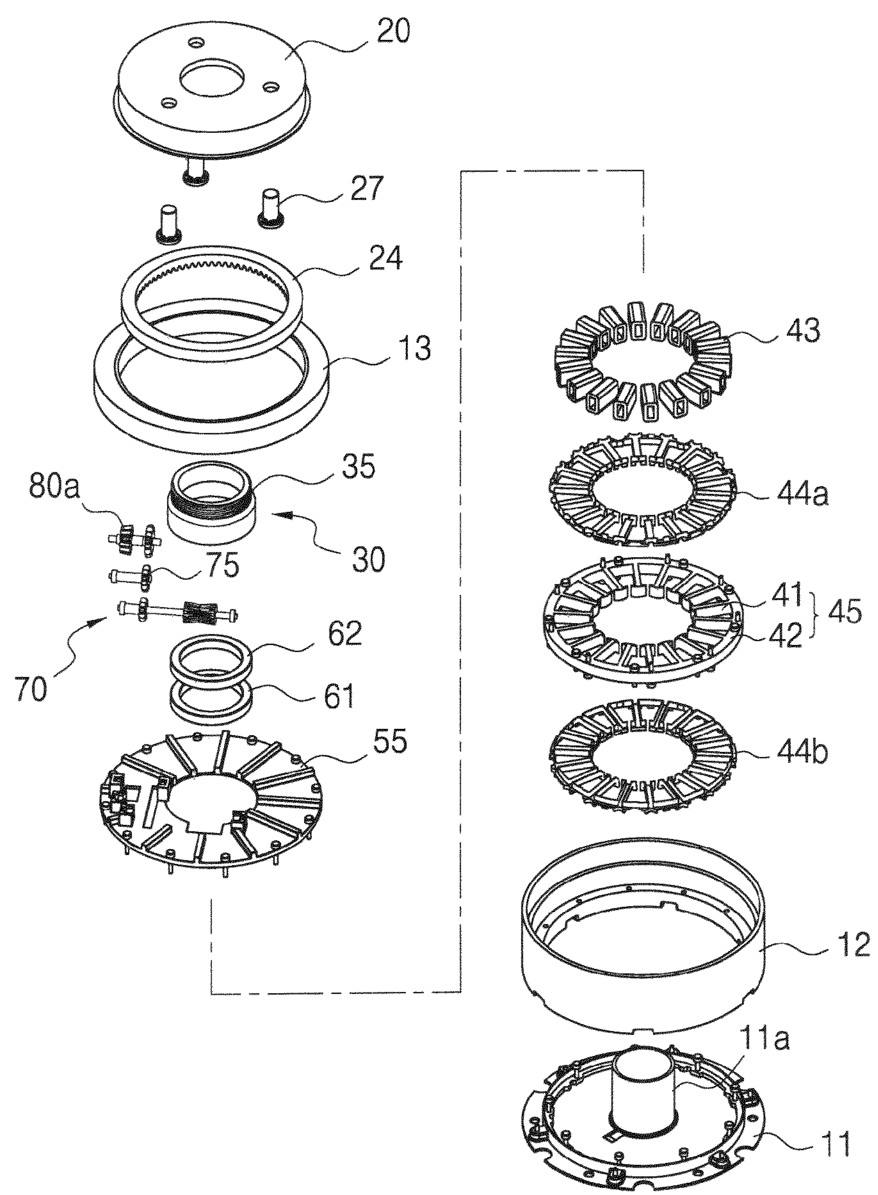
Figure 7:
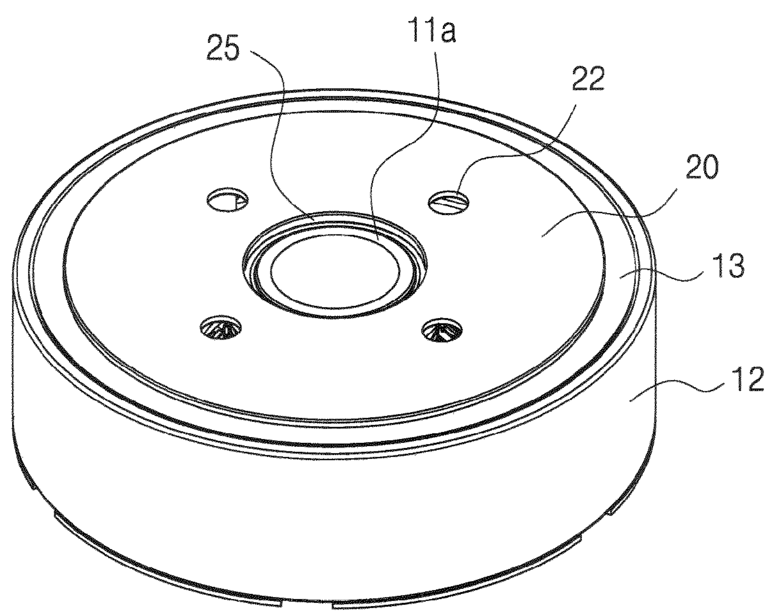
FIGS. 7 and 8 are respectively a perspective view and a plan view of an internal hollow swivel actuator according to a second embodiment of the present invention.
Figure 8:
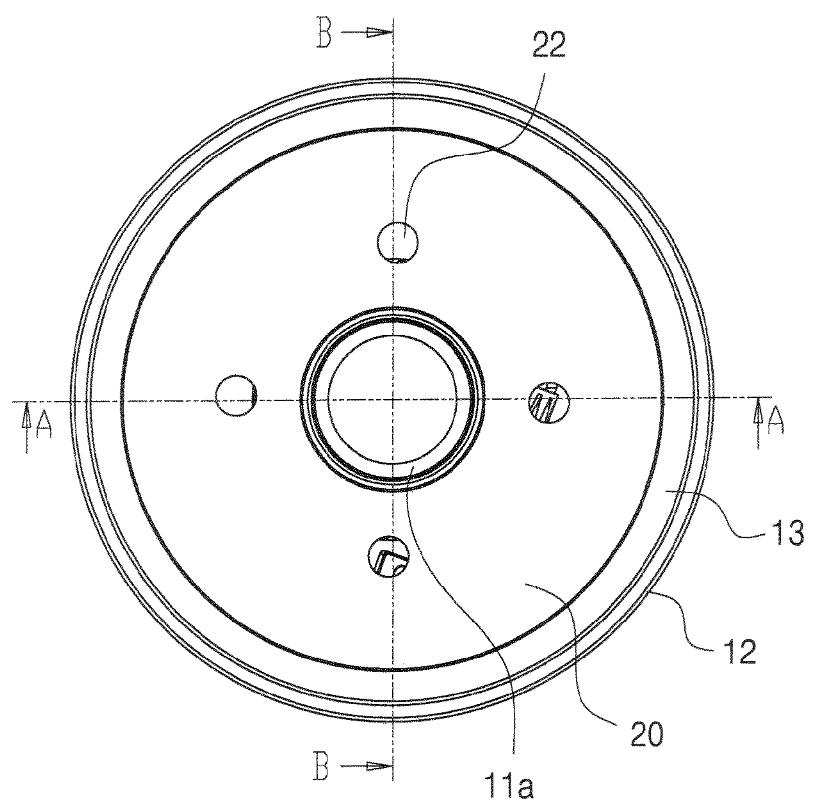
Figure 9A:
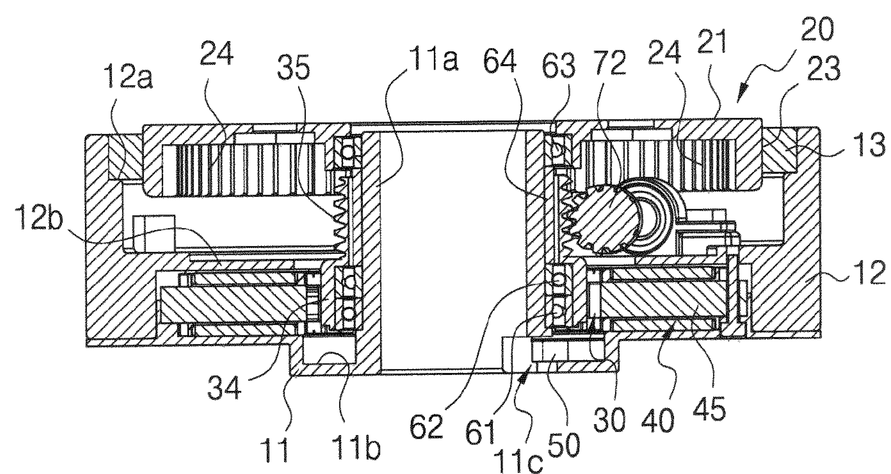
FIGS. 9A and 9B are cross-sectional views of lines C-C and D-D of FIG. 8, respectively.
Figure 9B:
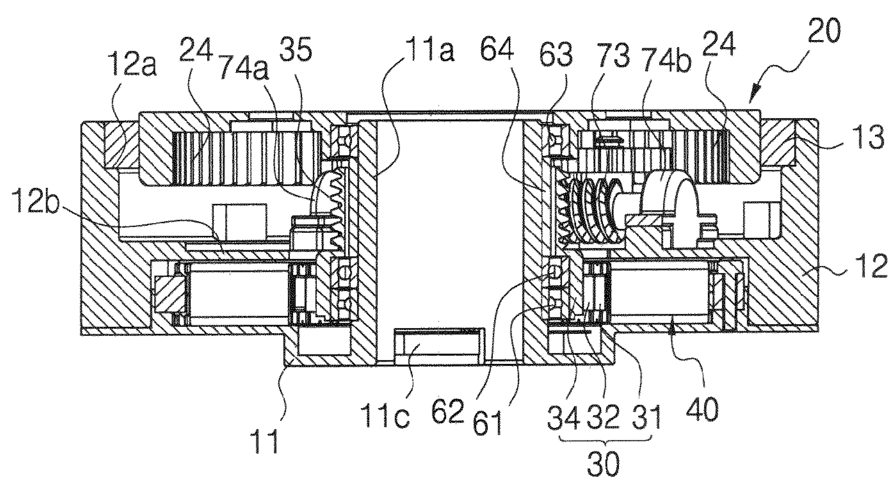
Figure 10:
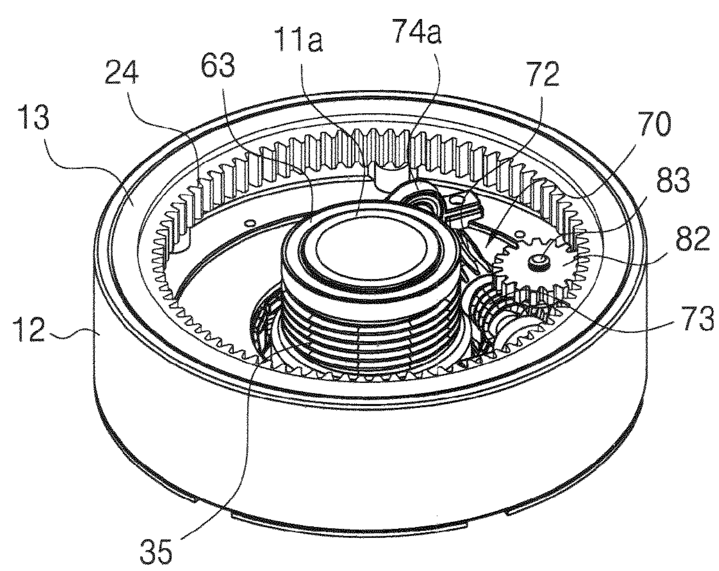
FIG. 10 is a perspective view illustrating a state in which a rotating table is inverted to explain a gear coupling relationship between a ring gear of a rotating table and a gear train in FIG. 8.
Figure 11:
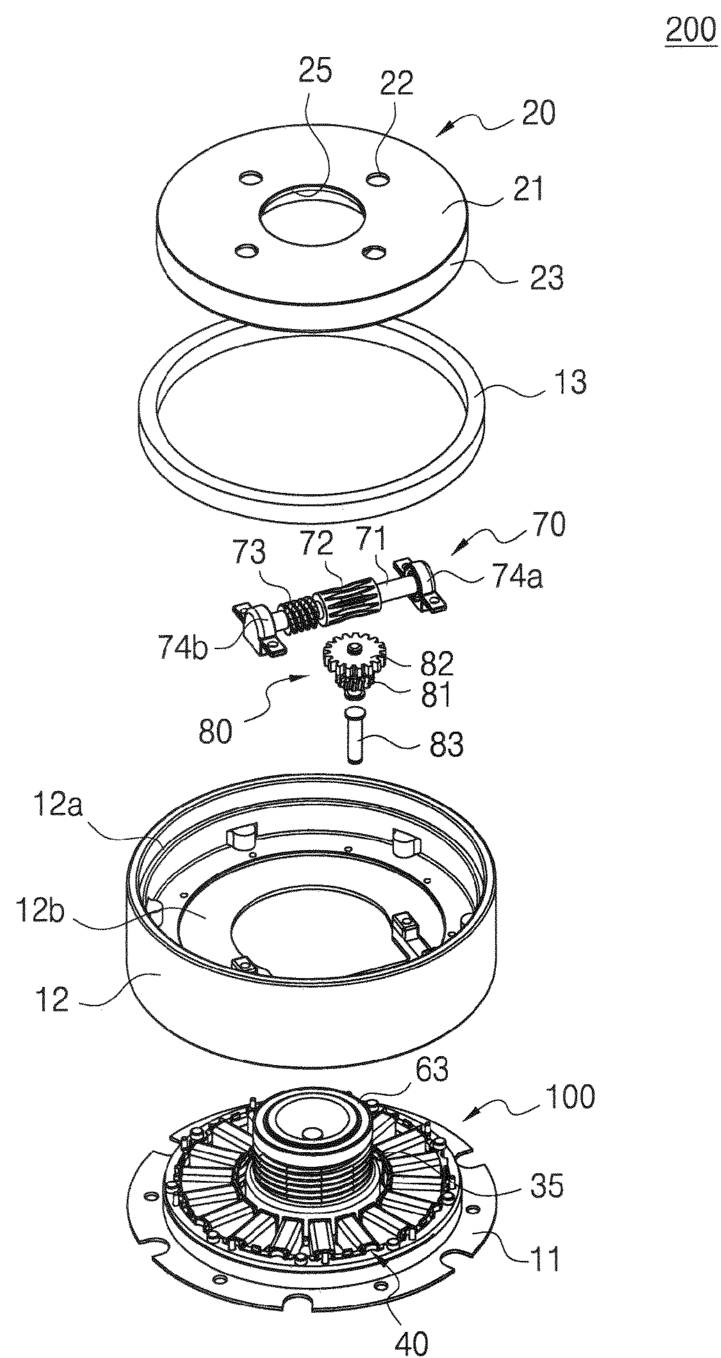
FIGS. 11 and 12 are a module-each exploded perspective view and a fully exploded perspective view of an internal hollow swivel actuator according to the second embodiment of the present invention, respectively.

Hereinafter, embodiments of the present invention will be described in detail with reference to the accompanying drawings.

The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

A swivel actuator according to the present invention is used for rotating a passive object together with a rotating table. In the following description, an inner hollow swivel actuator for driving the passive object by using a BLDC-type driving motor as a power source is described.

In general, it is difficult to apply a BLDC-type driving motor to an actuator with a disk-shaped housing structure, and in this invention, a driving motor is vertically erected in a lower portion of a housing and the size of the driving motor in a radial direction is increased to increase motor torque. The driving motor has a stator and a rotor arranged on the bottom surface of the housing, and uses an inner rotor type BLDC motor.

An actuator according to the conventional art includes a motor part made of a DC motor, a gear part, and a rotating part, which are configured as separate components, so when assembling the actuator to a main body using an actuator product, there are many problems such as assembly tolerance and supply of parts. Meanwhile, an actuator according to the present invention includes a driving motor, a gear train, and a rotating body, which are integrally formed, to thereby achieve miniaturization and slimness while solving the problems of conventional technology.

The swivel actuator according to the present invention may be applied for rotating, together with a rotating table, a passive object installed in the rotating table.

In addition, the swivel actuator according to this invention includes a BLDC-type driving motor, a gear train that transmits the rotational power of the driving motor to a rotating table and increases torque by reduction, and the rotating table which is rotated by an output of the gear train, wherein a passive object is coupled to the rotating table so that the passive object is rotated together with the rotating table. In this case, the driving motor, the gear train, and the rotating table are integrally assembled to the housing.

In addition, the swivel actuator according to the present invention is formed in a disc shape, and includes a through-hole for withdrawing a cable, which is formed in a central portion thereof as an inner hollow shape, and a plurality of coupling holes, for example, three or four coupling holes, which are formed on an upper portion of a rotating body (a rotating table) so as to be connected to a passive object, in which a lower end portion of a fixing bolt passes through each of the coupling holes so as to be screw-coupled to and fixed to a stud nut fixedly installed on an inner surface of the rotating table.

The swivel actuator according to an embodiment of the present invention has an annular stator arranged on the bottom of the housing and a rotor arranged therein and having a worm gear integrally formed on the upper side thereof. A worm wheel of a power transmission shaft forming a gear train is gear-engaged with the worm gear of the rotor, a worm gear formed on the other end of the power transmission shaft is coupled to a worm wheel located at the lower end of a pinion gear unit, and a pinion gear located at the upper end of the pinion gear unit is coupled to a ring gear formed inside a lateral surface portion of a rotating table, so as to rotate the rotating table.

The inner hollow swivel actuator of this invention may minimize backlash and suppress vibration by installing a BLDC-type driving motor on the bottom of a housing and placing, in a symmetrical structure inside the housing, a gear train in which a worm wheel and worm gear are integrally formed at intervals on a power transmission shaft.

Referring to FIGS. 1 to 6, an inner hollow swivel actuator according to a preferred first embodiment of the present invention includes: a cylindrical housing 10 in which a hollow cylindrical portion 11*a* protrudes from a bottom of a center thereof and first and second step portions 12*a* and 12*b* protrude from an inner wall thereof; a driving motor 100 which is arranged on a bottom surface of the housing 10 and has a first worm gear 35 integrally formed on an outer circumference of an extension unit extending to an upper portion of a rotor 30; a gear support plate 55 having an outer circumferential portion supported by the second step portion 12*b*; a gear train 70 which is arranged on an upper portion of the gear support plate 55, has a worm wheel 72 gear-engaged with one side of a power transmission shaft 71 on an outer circumference of the first worm gear 35, and has a first spur gear 73*a* formed on the other side of the power transmission shaft 71, to thereby increase torque by reduction; a dummy gear 75 for transmitting the rotational force of the first spur gear 73*a*; an output shaft 80*a* having a second spur gear 81*a* formed to be gear-engaged with the dummy gear 75 on one side thereof and a bevel gear 82*a* formed on the other side thereof; and a rotating table assembly 20*a* in which a ring gear 24 is gear-engaged with the bevel gear 82*a* of the output shaft 80*a* to be rotated.

The housing 10 includes: a cylindrical body case 12 with upper and lower portions opened and two-stage first and second step portions 12*a* and 12*b* protruding inside; and a circular lower cover 11 with an outer periphery fixed to a lower end of the body case 12 and the hollow cylindrical portion 11*a* protruding from the center thereof.

The driving motor 100 includes: a rotor 30 rotatably coupled to an outer circumference of the hollow cylindrical portion 11*a* of the lower cover 11; and a stator 40 arranged at an outer side of the rotor 30 with an air gap therebetween and arranged on an upper surface of the lower cover 11 to rotate the rotor 30 by generating a rotating magnetic field, wherein the first worm gear 35 is integrally formed on an outer circumferential portion of the extension unit of a rotor support 34 extending to an upper portion of the rotor 30.

The rotor 30 may use, as a magnet arranged on the outer circumference of a back yoke located inside the rotor 30, a magnet which includes split magnet pieces of a plurality of N-poles and S-poles or a magnet in which N-poles and S-poles are split-magnetized in multiple poles in a ring-shaped magnet. The back yoke is installed on a rear surface of the magnet to form a magnetic circuit.

The rotor 30 includes a rotor support 34 formed in a cup shape and first and second bearings 61 and 62 rotatably supporting the rotor are installed between the inner circumferential portion of the rotor support 34 and the cylindrical portion 11*a*.

The back yoke and the magnet are supported on an outer circumference of a lower end of the rotor support 34, and the first worm gear 35 is integrally formed on an outer circumference of an upper end thereof.

The stator 40 includes: a stator core 45 having a plurality of teeth 41 formed in a "T" shape and the back yoke 42 connected to the plurality of teeth 41 to form a magnetic circuit; upper and lower insulators 44*a* and 44*b* surrounding the outer circumferential surface of each of the plurality of teeth 41 at an upper portion and a lower portion thereof; and a coil 43 wound around the outer circumferential surfaces of the upper and lower insulators 44*a* and 44*b*.

In this case, the upper and lower insulators 44*a* and 44*b* may integrally form a bobbin with an insulating material so as to surround the outer circumferential surface of each of the plurality of teeth 41.

In addition, the bobbin 44 may be integrally formed with a stator support surrounding the back yoke 42 together with the plurality of teeth 42.

A concave groove is formed in a central portion of the lower cover 11, and a Hall sensor assembly in which a plurality of Hall sensors are mounted on a printed circuit board is arranged in the concave groove to detect a rotor position signal when the rotor is rotated.

The swivel actuator 200 according to this invention may include a BLDC motor with a 20 pole-18 slot structure, for example, as the driving motor 100. In addition, when the coil 43 of the stator 40 is wound on the plurality of teeth 41, the driving motor 100 may be configured to wind the coil 43 in a U, V, and W three-phase structure, and the other ends of the U, V, and W three-phase coils 43 may be connected in a star-connection method. Moreover, the driving motor 100 may be driven by a 6-step full-wave driving method using an inverter after receiving a rotor position signal from two or three Hall sensors, for example, in a motor driving circuit.

The gear train 70 is arranged above the gear support plate 55 with the outer periphery supported by the second step 12*b*, and the power transmission shaft 71 is arranged adjacent to the hollow cylindrical portion 11*a*, and both ends of the power transmission shaft 71 are rotatably supported by a pair of bearings.

In the gear train 70, the worm wheel 72 arranged on one side of the power transmission shaft 71 is gear-engaged with the outer circumference of the first worm gear 35, and the first spur gear 73*a* is formed on the other side of the power transmission shaft 71.

The dummy gear 75 for transmitting the rotational force of the first spur gear 73) to the output shaft 80*a* without reduction is coupled to the first spur gear 73*a*. When the bevel gear 82*a* of the output shaft 80*a* is gear-engaged with the ring gear 24, the dummy gear 75 is installed to move the coupling position so that the gear-engaged position takes place in a good position. As a result, as the output shaft 80*a* is arranged through the dummy gear 75, the output shaft 80*a* may be positioned in the center direction of the ring gear 24.

The output shaft 80*a* has a second spur gear 81*a* gear-engaged with the dummy gear 75 on one side thereof and a bevel gear 82*a* on the other side thereof.

Both the dummy gear 75 and the output shaft 80*a* are arranged above the gear support plate 55.

The bevel gear 82*a* of the output shaft 80*a* is gear-engaged with the ring gear 24 assembled to a bottom inner circumference of a rotating table 20.

The rotating table assembly 20*a* includes the inverted cup-shaped rotating table 20 and the ring gear 24 coupled to the inner periphery of the side surface 23 of the rotating table 20 and with a gear formed on the lower surface thereof.

The rotating table 20 has a circular upper plate 21 and the side surface 23 extending downward from the outer periphery of the upper plate 21.

A plurality of coupling holes are penetrated in the upper plate 21 of the rotating table 20 to be coupled to a main body being a passive object installed in the rotating table 20, and a fixing bolt 27 is fastened to each of the coupling holes of the bottom surface of the upper plate (21).

A central through hole 25 through which a cable for connecting to a motor driving circuit installed outside the swivel actuator 200 passes from a stator coil 43 of the driving motor 100 and a plurality of Hall sensors provided in the Hall sensor assembly is formed at the center of the upper plate 21. In this case, the motor driving circuit may be embedded in a space formed under the housing.

In addition, on the side surface 23 of the rotating table 20, a bearing 13*a* is installed between the outer periphery and the body case 12 to rotatably support the rotating table 20. A lower portion of the bearing 13*a* is supported by the first step portion 12*a* of the body case 12.

In this case, in the first embodiment, the bearing 13*a* is inserted between the rotating table 20 and the body case 12, but a ring-shaped oil seal 13 may be inserted therebetween instead of the bearing 13*a*.

Moreover, the upper end of the hollow cylindrical portion 11*a* of the lower cover 11 is located in the central through hole 25, and a third bearing may be integrally installed in the center of the lower surface of the upper plate 21 to rotatably support the rotating table 20 to the outer periphery of the hollow cylindrical portion 11*a*.

In the present invention, backlash may be minimized by a gear train changing structure in which the worm wheel 72 and the spur gear 73*a* are integrally formed at intervals on the power transmission shaft 71 to minimize the number of coupling gears.

Hereinafter, an operation of the inner hollow swivel actuator 200 according to the first embodiment of the present invention will be described with reference to FIGS. 1 to 6.

When the BLDC drive motor 100 installed on the bottom of the housing 10 is operated in the internal hollow swivel actuator 200 of this invention, the rotor 30 rotates and the first worm gear 35 formed integrally on the upper side of the rotor 30 rotates in the same direction.

When the first worm gear 35 rotates, the worm wheel 72 of the gear train 70 gear-engaged with the first worm gear 35 rotates and the power transmission shaft 71 also rotates. As a result, the first spur gear 73*a* formed on the other side of the power transmission shaft 71 rotates the gear-engaged dummy gear 75.

According to the rotating of the dummy gear 75, the second spur gear 81*a* of the output shaft 80*a* that is gear-engaged with the dummy gear 75 rotates, so that the rotating shaft 83*a* also rotates. Accordingly, since the bevel gear 82*a* located at the other end of the rotating shaft 83*a* rotates, the ring gear 24 gear-engaged with the bevel gear 82*a* also rotates.

Accordingly, the rotating table 20 on which the ring gear 24 is assembled is rotated in the same direction.

In this invention, reduction is achieved according to the gear ratio setting between the first worm gear 35 and the worm wheel 72, so that the rotational speed of the rotating table 20 is lowered, resulting in a large torque increase.

Hereinafter, an inner hollow swivel actuator according to a second embodiment of the present invention will be described with reference to FIGS. 7 to 12.

An inner hollow swivel actuator 200 according to the second embodiment of the present invention includes: a cylindrical housing 10 in which a hollow cylindrical portion 11*a* protrudes from a center thereof and first and second step portions 12*a* and 12*b* protrude from an inner side wall thereof; a driving motor 100 which is arranged on a bottom surface of the housing 10 and has a first worm gear 35 integrally formed on an outer circumference of an extension unit extending to an upper portion of a rotor 30; a gear train 70 which is arranged on an upper portion of the second step portion and adjacent to the first worm gear 35, is coupled to an outer circumference of the first worm gear 35, has a first worm wheel 72 gear-engaged with the first worm gear 35 on one side of a power transmission shaft 71, and has a second worm gear 73 formed on the other side of the power transmission shaft 71; a pinion gear unit 80 having a second worm wheel 81 gear-engaged with the second worm gear 73 at a lower end thereof and a pinion gear 82 integrally formed on an upper end thereof; and a rotating table 20 gear-engaged with a ring gear 24 having the pinion gear 82 of the pinion gear unit 80 integrally formed on an inner side of a side surface portion thereof, to rotate.

The housing 10 includes: a cylindrical body case 12 with upper and lower portions opened and two-stage first and second step portions 12*a* and 12*b* protruding inside; and a circular lower cover 11 having a lower end supported by an outer periphery of the body case 12 and the hollow cylindrical portion 11*a* protruding from the center thereof.

The driving motor 100 may be configured as an inner rotor type in which a rotor is arranged inside a stator, and includes the rotor 30 rotatably coupled to the outer circumference of the hollow cylindrical portion 11*a* of the lower cover 11, and the stator 40 arranged at an outer side of the rotor 30 with an air gap therebetween and arranged on an upper surface of the lower cover 11 to rotate the rotor 30 by generating a rotating magnetic field, wherein the first worm gear 35 is integrally formed on the outer peripheral portion of the extension portion of the rotor support 34 extending to the upper portion of the rotor 30.

In the rotor 30, a magnet arranged on the outer circumference of a back yoke located inside the rotor 30, may include a magnet which includes split magnet pieces of a plurality of N-poles and S-poles or a magnet in which N-poles and S-poles are split-magnetized in multiple poles in a ring-shaped magnet. The back yoke is installed on a rear surface of the magnet to form a magnetic circuit.

The rotor 30 includes a rotor support 34 formed in a cup shape, and first and second bearings 61 and 62 rotatably supporting the rotor are installed between the inner circumferential portion of the rotor support 34 and the cylindrical portion 11*a*.

The back yoke and the magnet are supported on an outer circumference of a lower end of the rotor support 34, and the first worm gear 35 is integrally formed on an outer circumference of an upper end thereof.

The stator 40 includes: a stator core 45 having the plurality of teeth 41 formed in a "T" shape and the back yoke 42 connected to the plurality of teeth 41 to form a magnetic circuit; the upper and lower insulators 44*a* and 44*b* of an insulating material integrally formed to surround the outer circumferential surface around which the coil 43 is wound in each of the plurality of teeth 41; and the coil 43 wound around the outer circumferential surfaces of the upper and lower insulators 44*a* and 44*b*.

In this case, the insulator 44*a* and 44*b* may be integrally formed as a bobbin and a stator support surrounding the back yoke 42 along with the plurality of teeth 41.

Figure 12:
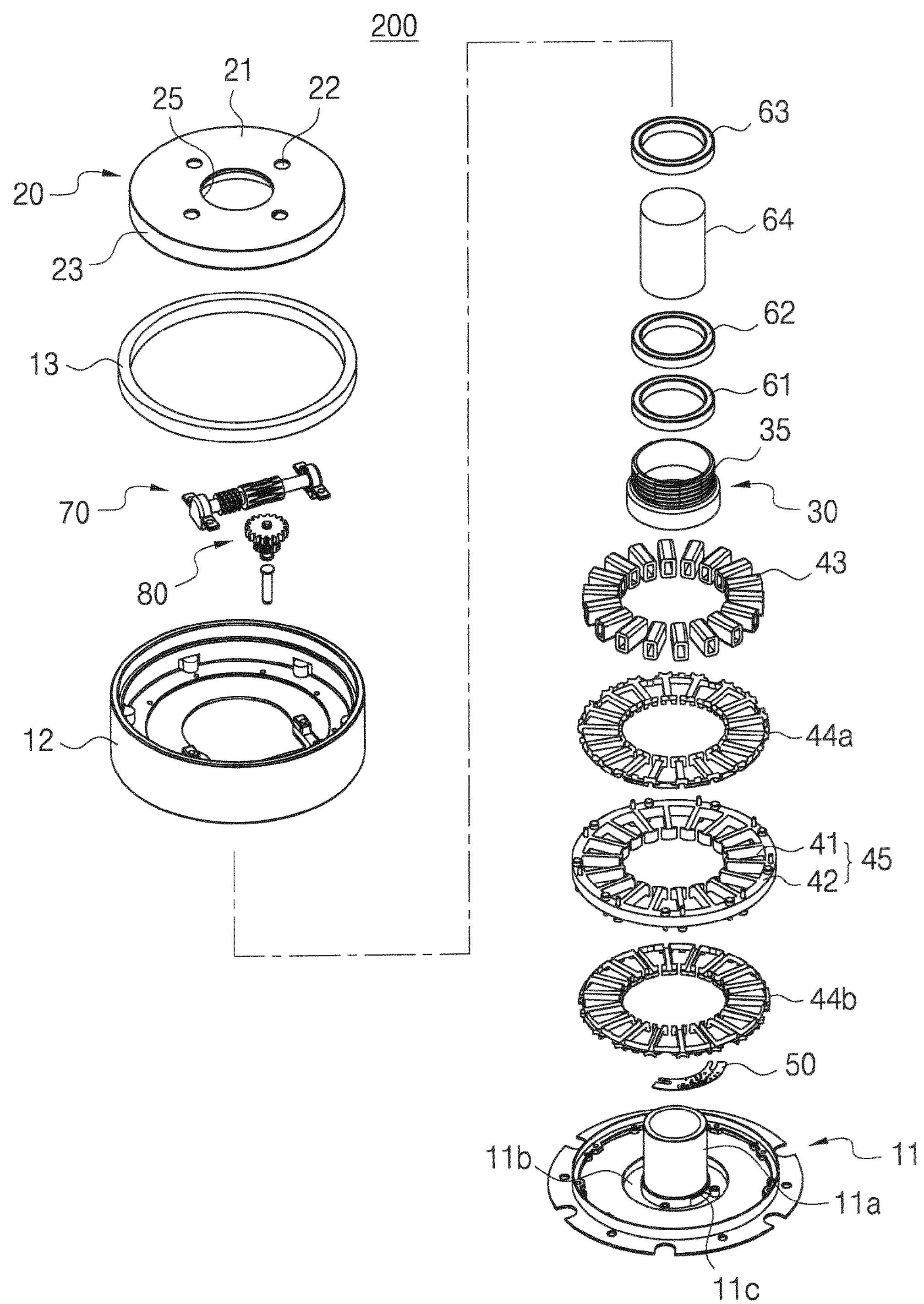

An annular groove 11*b* is formed in the central portion of the lower cover 11 as shown in FIG. 12, and a Hall sensor assembly 50 installed adjacent to the lower end of the rotor in which a plurality of Hall sensors are mounted on a printed circuit board is arranged in the annular groove 11*b* to detect a rotor position signal when the rotor is rotated.

The swivel actuator 200 according to this invention may include the BLDC motor with a 20 pole-18 slot structure, for example, as the driving motor 100. In addition, when the coil 43 of the stator 40 is wound on the plurality of teeth 41, the driving motor 100 may be configured to wind the coil 43 in a U, V, and W three-phase structure, and the other ends of the U, V, and W three-phase coils 43 may be connected in a star-connection method. Moreover, the driving motor 100 may be driven by a 6-step full-wave driving method using an inverter after receiving a rotor position signal from two or three Hall sensors, for example, in a motor driving circuit.

The gear train 70 is arranged adjacent to the hollow cylindrical portion 11*a* on the upper portion of the second step portion 12*b*, and both ends of the power transmission shaft 71 are rotatably supported by a pair of bearings 74*a* and 74*b*, respectively.

The second step portion 12*b* extends from the body case (12) toward the center to support the gear train 70 and the pinion gear unit 80 separately from the stator 40 placed on the lower side thereof.

The gear train 70 is coupled to the outer circumference of the first worm gear 35, the first worm wheel 72 gear-engaged with the first worm gear 35 is formed on one side of the power transmission shaft 71, and the second worm gear 73 is formed on the other side of the power transmission shaft 71.

The pinion gear unit 80 is rotatably installed on a support shaft 83 installed in the second step portion 12*b*, and includes the second worm wheel 81 formed at the lower end thereof to be gear-engaged with the second worm gear 73, and a pinion gear 82 integrally formed on the upper end thereof.

The rotating table 20 has the circular upper plate 21 and the side surface 23 extending downward from the outer periphery of the upper plate 21. The upper plate 21 has a plurality of coupling holes 22 for coupling with a main body, which is a passive body installed in the rotating table 20, and a plurality of stud nuts 26 to which fixing bolts 27 are fastened are attached to the coupling holes 22 of the bottom surface of the upper plate 21.

A central through hole 25 through which a cable for connecting to a motor driving circuit installed outside the swivel actuator 200 passes from a stator coil 43 of the driving motor 100 and a plurality of Hall sensors provided in the Hall sensor assembly 50 is formed at the center of the upper plate 21. The cable is connected to the stator coil 43 and the Hall sensor assembly 50 through the central through hole 25 and the cylindrical portion 11*a* of the upper plate 21.

A through hole 11*c* communicating with the groove 11*b* of the lower cover 11 is formed at the lower end of the hollow cylindrical portion 11*a*, so that the cable may pass therethrough.

Moreover, the upper end of the hollow cylindrical portion 11*a* of the lower cover 11 is located in the central through hole 25, and a third bearing 63 may be integrally installed in the center of the lower surface of the upper plate 21 to rotatably support the rotating table 20 to the outer periphery of the hollow cylindrical portion 11*a*.

Moreover, a ring-shaped stopper 64 is inserted between the third bearing 63 and the second bearing 62 installed on the outer periphery of the hollow cylindrical portion 11*a*, to set the positions of the third bearing 63 and the second bearing 62.

The ring gear 24 is integrally formed on the inner side of the side surface 23 of the rotating table 20, and the ring gear 24 is gear-engaged with the pinion gear 82 of the pinion gear unit 80.

In addition, a ring-shaped oil seal 13 is inserted between the rotating table 20 and the body case 12, and the lower portion is supported by the first step portion 12*a*.

In the present invention, there is provided a power transmission structure capable of minimizing backlash by a gear train changing structure in which the first worm wheel 72 and the second worm gear 73 are integrally formed at intervals on the power transmission shaft 71 to minimize the number of coupling gears. As a result, the present invention may reduce overall size and secure a space compared to a conventional gear train in which a plurality of spur gears are combined, thereby increasing degree of freedom in design and reducing costs.

In addition, according to the present invention, the BLDC drive motor 100 is installed on the bottom of the housing 10, and the gear train 70, in which the first worm wheel 72 and the second worm gear 73 are integrally formed at intervals on the power transmission shaft 71, is arranged in the second step portion 12*b* inside the housing, thereby simplifying a structure and reducing a size.

In the present invention, both ends of the power transmission shaft 71 are rotatably supported by the pair of bearings 74*a* and 74*b*. The pair of bearings 74*a* and 74*b* are embedded in a bearing housing fixedly installed in the second step portion 12*b*.

Hereinafter, an operation of the inner hollow swivel actuator 200 according to the second embodiment of the present invention will be described with reference to FIGS. 7 to 12.

When the BLDC drive motor 100 installed on the bottom of the housing 10 is operated in the internal hollow swivel actuator 200 of this invention, the rotor 30 rotates and the first worm gear 35 formed integrally on the upper side of the rotor 30 rotates in the same direction.

When the first worm gear 35 rotates, the first worm wheel 72 of the gear train 70 gear-engaged with the first worm gear 35 rotates and the power transmission shaft 71 also rotates.

As a result, the second worm gear 73 formed on the other side of the power transmission shaft 71 rotates the second worm wheel 81 of the gear-engaged pinion gear unit 80.

Accordingly, the pinion gear 82 located at the top of the pinion gear unit 80 is rotated, and the pinion gear 82 rotates the ring gear 24 provided in the rotating table 20.

In the present invention, for example, when the BLDC driving motor 100 is rotated at about 800 rpm, the BLDC driving motor 50 is decelerated to approximately 400:1 through the gear train 70, and the rotating table 20 is reduced in rotating speed to about 2 rpm, resulting in an increase in a large torque.

As described above, in the present invention, the gear train 70 is formed by integrally forming the first worm wheel 72 and the second worm gear 73 at intervals on the power transmission shaft 71, the first worm wheel 72 is gear-engaged with the first worm gear 35 formed integrally on the upper portion of the rotor support 34, the second worm gear 73 is gear-engaged with the second worm wheel 81 of the pinion gear unit 80, and the ring gear 24 is gear-engaged with the pinion gear 82, to provide the power transmission shaft of transmitting rotational power to the rotating table 20.

In this invention, there is provided a power transmission structure that may minimize backlash by a gear train change structure that minimizes the number of coupling gears using the power transmission shaft 71 on which the first worm wheel 72 and the second worm gear 73 are integrally formed at intervals.

In addition, lowering the rpm of the driving motor, which is generally a factor of noise increase, requires a combination of a plurality of gears to increase the reduction gear ratio of the gear train to obtain a desired torque value, but in the present invention, the second worm gear 73 of a multiple thread screw is employed in the gear train 70 to increase the gear reduction ratio to solve this problem.

Furthermore, in this invention, the small driving motor 100 and the power transmission shaft 71 in which the first worm wheel 72 and the second worm gear 73 constituting the gear train 70 are integrally formed are optimally placed inside the housing 10 to reduce the size.

It is difficult to apply a BLDC motor to a general motor, and in this invention, the BLDC motor is vertically erected and the size of the motor in a radial direction is increased to increase motor torque. The driving motor 100 employed in the swivel actuator 200 of the present invention includes a stator 40 and a rotor 30 arranged on the bottom surface of the housing 10, and employs an inner rotor type BLDC motor.

The swivel actuator 200 according to the present invention may be applied for rotating, together with a rotating table 20, a passive object installed in the rotating table 20.

The swivel actuator 200 according to the present invention includes: a BLDC-type driving motor 100; a gear train for transmitting the rotational power of the driving motor 100 to a rotating table 20 and increasing torque by reduction; and the rotating table 20 rotated by the output of the gear train, wherein a passive object is coupled to the rotating table 20 so as to rotate together with the rotating table.

An actuator according to the conventional art includes a motor part made of a DC motor, a gear part, and a rotating part, which are configured as separate components, so when assembling the actuator to a main body using an actuator product, there are many problems such as assembly tolerance and supply of parts.

However, the swivel actuator 200 according to this invention has the driving motor 100, the gear train 70, and the rotating table 20 which are integrally formed, to thereby achieve miniaturization and slimness while solving the problems of conventional technology.

The swivel actuator 200 according to the present invention is formed in a disc shape, and includes a through-hole for withdrawing a cable, which is formed to withdraw the cable in a central portion thereof as an inner hollow shape, and a plurality of coupling holes, for example, four coupling holes, which are formed on an upper portion of the rotating table 20 so as to be connected to a passive object, in which fixing bolts 27 are installed in the coupling holes.

The swivel actuator 200 according to the second embodiment of the present invention is the same as the first embodiment in that the BLDC motor is used, and the former differs from the latter in that a structure of the gear train for reduction is more compactly deformed than the first embodiment. In addition, the swivel actuator may be applied to rotate and drive the rotating table as a passive object.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention can be applied to a swivel actuator capable of rotating a rotating table by a power transmission structure capable of minimizing backlash by a gear train change structure in which a worm wheel and a worm gear are integrally formed at intervals on a power transmission shaft to minimize the number of coupling gears.

What is claimed is:

1. A driving motor for a swivel actuator comprising:

a cylindrical housing having a hollow cylindrical portion protruding from a bottom thereof at a center thereof;

a rotor rotatably coupled to an outer circumference of the hollow cylindrical portion of the housing; and a stator arranged on the bottom of the housing to rotate the rotor by generating a rotating magnetic field while having an air gap on an outside of the rotor, wherein a first worm gear is integrally formed on an outer circumferential portion of an extension unit extending to an upper portion of the rotor, and wherein the housing comprises: a cylindrical body case having open upper and lower portions and first and second step portions of a two-stage structure protruding inside; and a circular lower cover having an outer circumferential portion fixed to a lower end of the body case and a hollow cylindrical portion protruding from a center thereof.

2. The driving motor for a swivel actuator of claim 1, wherein the first and second step portions protrude from an inner side wall of the housing, and the stator is arranged at a lower side of the first and second step portions.

3. The driving motor for a swivel actuator of claim 1, wherein the second step portion of the body case is configured to separate the gear train from the stator of the swivel actuator.

4. The driving motor for a swivel actuator of claim 1, wherein an annular groove is formed between the hollow cylindrical portion protruding in the center of a lower cover and the bottom of the housing, a Hall sensor assembly, which is installed close to the lower end of the rotor, is arranged in the annular groove to detect a rotor position signal when the rotor is rotated, and a through-hole communicating with a concave groove of the lower cover is formed at a lower end of the hollow cylindrical portion so that a cable can pass therethrough.

5. The driving motor for a swivel actuator of claim 1, wherein the rotor comprises:

a rotor support which is rotatably coupled to the outer circumference of the hollow cylindrical part and is formed in a cup shape;

a back yoke coupled to an outer circumference of a cup-shaped portion of the rotor support; and a magnet arranged on an outer circumference of the back yoke, wherein a first worm gear is integrally formed on an outer circumferential portion of an upper end of the rotor support.

6. A swivel actuator comprising:

a cylindrical housing in which a hollow cylindrical portion protrudes from a bottom of a center thereof and first and second step portions protrude from an inner side wall thereof;

a driving motor which is arranged on a bottom surface of the housing and has a first worm gear integrally formed on an outer circumference of an extension unit extending to an upper portion of a rotor;

a gear train for reduction which is arranged on an upper portion of the second step portion, is coupled to an outer circumference of the first worm gear, has a first worm wheel gear-engaged with the first worm gear on one side of a power transmission shaft, and has a second worm gear formed on the other side of the power transmission shaft;

a pinion gear unit having a second worm wheel gear-engaged with the second worm gear at a lower end thereof and a pinion gear integrally formed on an upper end thereof; and a rotating table gear-engaged with a ring gear having the pinion gear of the pinion gear unit integrally formed on an inner side of a side surface portion thereof, to rotate, and having a passive object fixed to an upper surface thereof.

7. The swivel actuator of claim 6, wherein an annular groove is formed between the hollow cylindrical portion protruding in the center of a lower cover and the bottom of the housing, a Hall sensor assembly, which is installed close to the lower end of the rotor, is arranged in the annular groove to detect a rotor position signal when the rotor is rotated, and a through-hole communicating with a concave groove of the lower cover is formed at a lower end of the hollow cylindrical portion so that a cable can pass therethrough.

8. The swivel actuator of claim 6, wherein the driving motor comprises:

a rotor rotatably coupled to an outer circumference of the hollow cylindrical portion of the housing; and a stator arranged on the bottom of the housing to rotate the rotor by generating a rotating magnetic field while having an air gap on an outside of the rotor, wherein the first worm gear is integrally formed in an extension unit extending to an upper portion of a rotor support.

9. The swivel actuator of claim 6, wherein the driving motor comprises:

a rotor rotatably coupled to an outer circumference of the hollow cylindrical portion of the housing; and a stator arranged on the bottom of the housing to rotate the rotor by generating a rotating magnetic field while having an air gap on an outside of the rotor, wherein the first worm gear is integrally formed in an extension unit extending to an upper portion of a rotor support.

10. The swivel actuator of claim 6, further comprising:

first and second bearings arranged between a lower end of the rotor support and a lower end of the hollow cylindrical portion of the housing to rotatably support the rotor; and a third bearing rotatably supporting the rotating table on the outer circumference of the hollow cylindrical portion of the housing.

11. The swivel actuator of claim 10, further comprising a ring-shaped stopper inserted between the second bearing and the third bearing installed on the outer circumference of the hollow cylindrical portion to set the positions of the second bearing and the third bearing.

12. The swivel actuator of claim 6, wherein an oil seal provided between the rotating table and the housing and having a lower portion supported by the first step portion of the housing.

13. The swivel actuator of claim 6, wherein the second worm gear is made of a multiple thread screw.

14. A swivel actuator comprising:

a cylindrical housing in which a hollow cylindrical portion protrudes from a bottom of a center thereof and a step portion protrudes from an inner side wall thereof;

a driving motor which is arranged on a bottom surface of the housing and has a first worm gear integrally formed on an outer circumference of an extension unit extending to an upper portion of the rotor;

a gear support plate having an outer circumferential portion supported by the step portion;

a gear train for reduction which is arranged on an upper portion of the gear support plate, is coupled to an outer circumference of the first worm gear, has a first worm wheel gear-engaged with the first worm gear on one side of a power transmission shaft, and has a first spur gear formed on the other side of the power transmission shaft;

a dummy gear coupled to the first spur gear to transmit the rotational force of the first spur gear without reduction;

an output shaft having a second spur gear formed to be gear-engaged with the dummy gear on one side of a rotating shaft and a bevel gear formed on the other side thereof; and a rotating table in which a ring gear assembled to a lower portion of the bevel gear is gear-engaged to be rotated, and a passive object is fixed on an upper surface thereof.

* * * * *